United States Patent
Pacheco

(10) Patent No.: US 12,461,391 B1
(45) Date of Patent: Nov. 4, 2025

(54) EYEGLASSES WITH INTEGRAL AIR BLOWERS

(71) Applicant: Raymundo V. Pacheco, Roanoke, TX (US)

(72) Inventor: Raymundo V. Pacheco, Roanoke, TX (US)

(*) Notice: Subject to any disclaimer, the term of this patent is extended or adjusted under 35 U.S.C. 154(b) by 390 days.

(21) Appl. No.: 17/992,301

(22) Filed: Nov. 22, 2022

Related U.S. Application Data

(60) Provisional application No. 63/288,150, filed on Dec. 10, 2021.

(51) Int. Cl.
| | | |
|---|---|---|
| G02C 11/08 | (2006.01) | |
| A45C 11/04 | (2006.01) | |
| G02C 11/00 | (2006.01) | |
| H02J 7/00 | (2006.01) | |

(52) U.S. Cl.
CPC .............. *G02C 11/08* (2013.01); *A45C 11/04* (2013.01); *G02C 11/10* (2013.01); *H02J 7/0045* (2013.01)

(58) Field of Classification Search
CPC ......... G02C 11/08; G02C 11/10; A45C 11/04; H02J 7/0045
USPC .......................................................... 351/158
See application file for complete search history.

(56) References Cited

U.S. PATENT DOCUMENTS

| | | | |
|---|---|---|---|
| 9,921,420 B2* | 3/2018 | Bella ...................... | G02C 11/08 |
| 2014/0102442 A1* | 4/2014 | Wilson .................... | F24F 9/00 |
| | | | 128/200.28 |
| 2017/0090218 A1* | 3/2017 | Bella ...................... | G02C 11/08 |
| 2019/0173294 A1* | 6/2019 | Paulson .................. | H02J 7/35 |
| 2020/0109986 A1* | 4/2020 | Howell ................... | G02C 11/10 |
| 2020/0215359 A1* | 7/2020 | Yu ........................... | A62B 9/06 |

* cited by examiner

*Primary Examiner* — William R Alexander
(74) *Attorney, Agent, or Firm* — Kenneth L. Tolar

(57) ABSTRACT

Eyeglasses include a frame with air blowers integrally positioned within the lens frames. The blowers produce an air curtain around the frame that prevents airborne irritants from contacting the eyes. The air flow can be selectively adjusted or disabled with a control panel according to the wearer's preference.

19 Claims, 1 Drawing Sheet

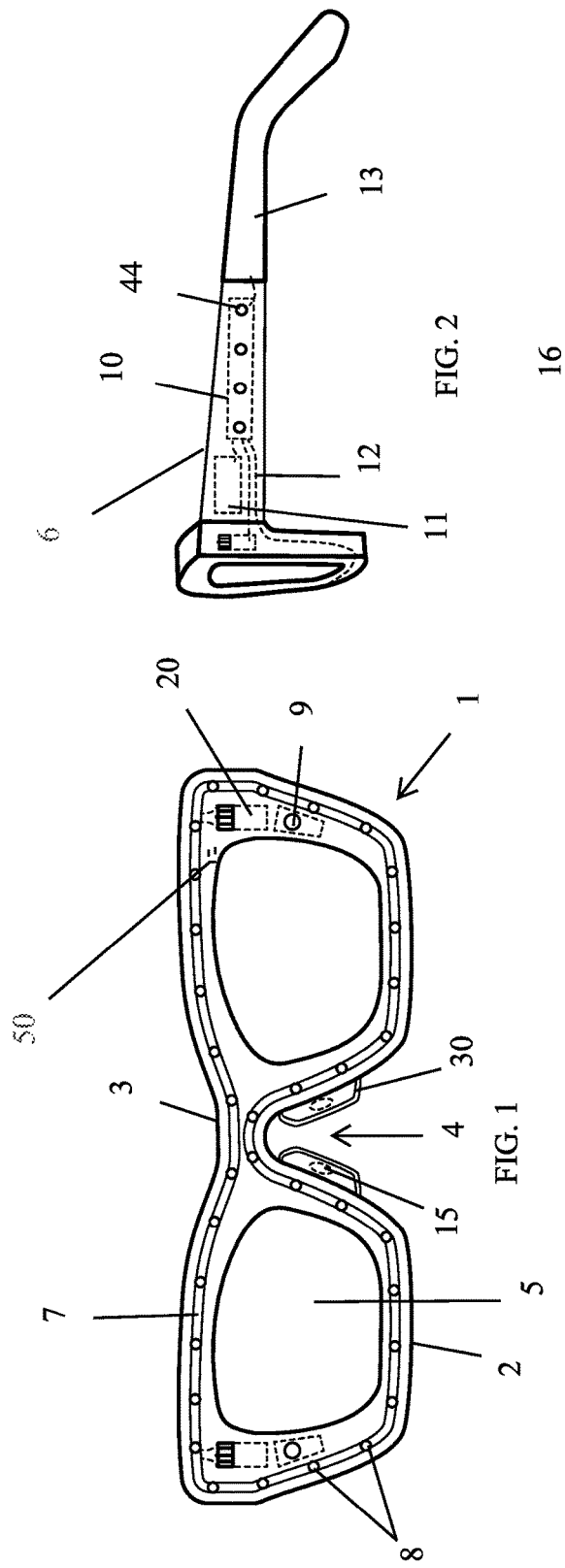
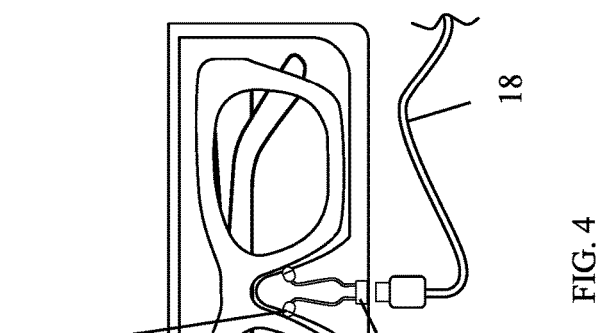
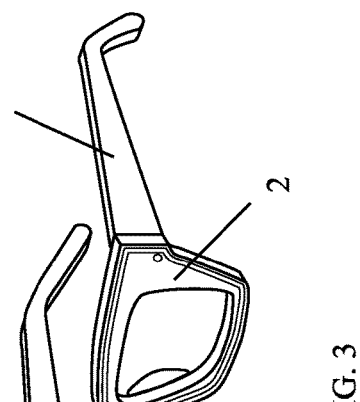
FIG. 1
FIG. 2
FIG. 3
FIG. 4

EYEGLASSES WITH INTEGRAL AIR BLOWERS

BACKGROUND OF THE INVENTION

The present invention relates to eyeglasses with integral air blowers that protect the eyes from smoke, dust, debris, fumes, and other airborne irritants.

DESCRIPTION OF THE PRIOR ART

Conventional eyewear generally protects the eyes from splashing liquids or projected solids that can cause serious injuries. However, conventional eyeglasses do not prevent gases or airborne debris from contacting the eyes. Though safety goggles provide more protection than glasses, they completely encapsulate the eyes and are therefore uncomfortable and irritating to wear. Furthermore, due to their unusual appearance, goggles are not practical for everyday use.

Accordingly, there is currently a need for a device that adequately protects a user's eyes from airborne irritants. The present invention addresses this need by providing eyeglasses with integral air blowers that create a barrier that protects the eyes from dust, debris, smoke, and similar airborne irritants.

SUMMARY OF THE INVENTION

The present invention relates to eyeglass including a frame with air blowers integrally positioned within the lens frames. The blowers produce an air curtain around the frame that prevents airborne irritants from contacting the eyes. The air flow can be selectively adjusted or disabled with a control panel positioned on the frame exterior according to the wearer's preference.

It is therefore an object of the present invention to provide eyeglasses that protect a wearer's eyes from airborne irritants.

It is therefore another object of the present invention to provide eyeglasses having integral air blowers that create a protective blanket around a wearer's eyes.

It is yet another object of the present invention to provide eyeglasses having integral air blowers that are automatically activated in the presence of airborne contaminants.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a rear, plan view of the eyeglasses according to the present invention.

FIG. 2 is a side view of the eyeglasses.

FIG. 3 is a perspective view of the eyeglasses.

FIG. 4 depicts the eyeglasses stored in the charging case.

DESCRIPTION OF THE PREFERRED EMBODIMENT

The present invention relates to eyeglasses comprising a hollow frame 1 including a pair of spaced rims 2 with a bridge 3 extending therebetween. Between the bridge and rims is an indentation 4 with a pair of opposing nose pads 30 therein for supporting the frame on a wearer's nose. Each rim retains a lens 5 constructed with transparent, safety-rated glass, plastic, or a similar equivalent. The lens can be non-corrective, corrective, bifocals, progressive and/or tinted to provide sun protection as desired. Pivotally attached to an outer edge of each rim is a temple 6 that rests atop a wearer's ear to further secure the frame to the wearer's face.

Within the interior of the frame is a continuous air conduit 7 that is connected to a pair of micromotor-driven fans 20 positioned within each rim. The conduit 7 is in fluid communication with multiple ports 8 peripherally positioned on the frame exterior. Each fan 20 includes an ambient air inlet having an ionizer 50 that enhances air quality prior to being projected through the ports. Proximal each fan are a photosensor and an ionization detector 9 that automatically activate the fans upon sensing airborne contamination. Embedded within each temple is a printed circuit board 10 and rechargeable batteries 11 that are electrically connected to the corresponding fan with wiring 12 or cables. A control panel including multiple buttons 44 on the exterior of each temple allows the wearer to independently adjust the speed of each fan to optimize comfort.

Solar panels 13 near a distal end of each temple supplement the batteries while the glasses are in use. However, the batteries can be completely recharged by an accompanying storage case 14 when not in use. The storage case includes a pair of hollow, spring-biased sections that open to expose a storage compartment. A pair of charging contacts 15 positioned on the nose pad 30 are electrically connected to the batteries and engage a pair of depressible pins 16 within the storage compartment when the glasses are properly positioned therein. One of the case sections includes a receptacle 17 for connecting a charging cable 18 that is coupled with an external power source to charge the batteries while the glasses are being stored.

Accordingly, when manually or automatically activated, the fans produce an air curtain around the eyeglasses that prevents airborne irritants from contacting the eyes. Moreover, the air flow can be selectively adjusted or disabled with the control panel 44 according to the wearer's preference.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. Eyeglasses comprising:
   a hollow frame including a pair of spaced rims with a bridge extending therebetween;
   a lens retained within each of said rims;
   a plurality of ports positioned on said frame;
   a fan received within said frame and in fluid communication with said ports for producing an air curtain around the rims that prevents airborne irritants from contacting a wearer's eyes;
   a photosensor and an ionization detector on said frame that automatically activates said fan upon sensing airborne contamination.

2. The eyeglasses according to claim 1 further comprising an indentation between the bridge and the rims, said indentation having a pair of opposing nose pads for supporting the frame on a wearer's nose.

3. The eyeglasses according to claim 1 further comprising a temple pivotally attached to an outer edge of each rim that rests atop a wearer's ear to further secure the frame to a wearer's face.

4. The eyeglasses according to claim 1 wherein said fan is driven by a micromotor.

5. The eyeglasses according to claim 1 wherein said fan includes an ambient air inlet having an ionizer that enhances air quality prior to being projected through said ports.

6. The eyeglasses according to claim 3 further comprising a button on said temple that adjusts a speed of said fan to optimize comfort.

7. The eyeglasses according to claim 1 further comprising solar panels on said frame for powering said fan.

8. The eyeglasses according to claim 1 further comprising at least one battery for powering said fan.

9. The eyeglasses according to claim 1 further comprising a storage case having a pair of hollow, spring-biased sections that open to expose a storage compartment that is dimensioned to receive said frame.

10. The eyeglasses according to claim 9 further comprising:
   a pair of charging contacts positioned on said nose pad that are electrically connected to the batteries, said contacts positioned to engage a pair of depressible pins within the storage compartment when the glasses are positioned therein;
   an electrical receptacle on one of said case sections;
   a charging cable connected to said electrical receptacle and coupled with an external power source to charge the battery while the glasses are stored.

11. Eyeglasses comprising:
   a hollow frame including a pair of spaced rims with a bridge extending therebetween;
   a lens retained within each of said rims;
   a plurality of ports positioned on said frame;
   a fan received within said frame and in fluid communication with said ports for producing an air curtain around the rims that prevents airborne irritants from contacting a wearer's eyes;
   a storage case having a pair of hollow, spring-biased sections that open to expose a storage compartment that is dimensioned to receive said frame;
   a pair of charging contacts positioned on said nose pad that are electrically connected to the batteries, said contacts positioned to engage a pair of depressible pins within the storage compartment when the glasses are positioned therein;
   an electrical receptacle on one of said case sections;
   a charging cable connected to said electrical receptacle and coupled with an external power source to charge the battery while the glasses are stored.

12. The eyeglasses according to claim 11 further comprising an indentation between the bridge and the rims, said indentation having a pair of opposing nose pads for supporting the frame on a wearer's nose.

13. The eyeglasses according to claim 11 further comprising a temple pivotally attached to an outer edge of each rim that rests atop a wearer's ear to further secure the frame to a wearer's face.

14. The eyeglasses according to claim 11 wherein said fan is driven by a micromotor.

15. The eyeglasses according to claim 11 wherein said fan includes an ambient air inlet having an ionizer that enhances air quality prior to being projected through said ports.

16. The eyeglasses according to claim 11 further comprising a photosensor and an ionization detector on said frame that automatically activates said fan upon sensing airborne contamination.

17. The eyeglasses according to claim 13 further comprising a button on said temple that adjusts a speed of said fan to optimize comfort.

18. The eyeglasses according to claim 11 further comprising solar panels on said frame for powering said fan.

19. The eyeglasses according to claim 11 further comprising at least one battery for powering said fan.

* * * * *